US005097111A

United States Patent [19]

Severance, Jr.

[11] Patent Number: 5,097,111

[45] Date of Patent: Mar. 17, 1992

[54] ELECTRODE FOR PLASMA ARC TORCH AND METHOD OF FABRICATING SAME

[75] Inventor: Wayne S. Severance, Jr., Florence, S.C.

[73] Assignee: ESAB Welding Products, Inc., Florence, S.C.

[21] Appl. No.: 679,785

[22] Filed: Apr. 3, 1991

Related U.S. Application Data

[62] Division of Ser. No. 466,205, Jan. 17, 1990, Pat. No. 5,023,425.

[51] Int. Cl.[5] ............ B23K 9/00

[52] U.S. Cl. ............ 219/121.52; 219/121.48; 219/119; 219/75

[58] Field of Search ............ 219/121.5, 121.52, 121.48, 219/119, 74, 75; 313/231.31, 231.41

[56] References Cited

U.S. PATENT DOCUMENTS 3,198,932 8/1965 Weatherly ............ 219/121.52
3,546,422 12/1970 Bykhovsky et al. ............ 219/75
3,597,649 8/1971 Bykhovsky et al. ............ 219/121.52
3,930,139 12/1975 Bykhovsky et al. ............ 219/75
3,944,778 3/1976 Bykhovsky et al. ............ 219/75
4,133,987 1/1979 Lakomsky et al. ............ 219/121.52
4,304,984 12/1981 Bololnikov et al. ............ 219/121.52
4,311,897 1/1982 Yerushalmy ............ 219/121.48
4,766,349 8/1988 Johansson et al. ............ 219/121.52

*Primary Examiner*—Mark H. Paschall
*Attorney, Agent, or Firm*—Bell, Seltzer, Park & Gibson

[57] ABSTRACT

An electrode for a plasma arc torch and a method of fabricating the same are disclosed, and wherein the electrode includes a copper holder having a lower end which mounts an emissive insert which acts as the cathode terminal for the arc during operation. Where the torch is used in an oxidizing atmosphere, the copper holder tends to oxidize, and the arc tends to attach to the oxidized copper rather than the insert, which results in the rapid destruction of the holder. To prevent this destruction, the present invention incorporates a sleeve of silver or other metal having a relatively high work function, and which is positioned to surround the insert and form an annular ring on the lower end surface of the holder and thus to surround the exposed end face of the emissive insert. The annular ring serves to prevent arcing from the copper holder, and so that the arc is maintained on the insert.

6 Claims, 5 Drawing Sheets

ELECTRODE FOR PLASMA ARC TORCH AND METHOD OF FABRICATING SAME

This application is a divisional of application Ser. No. 07/466,205, filed Jan. 17, 1990, now U.S. Pat. No. 5,023,425.

BACKGROUND OF THE INVENTION

The present invention relates to a plasma arc torch, and more particularly to a novel electrode for use in a plasma arc torch and which has improved service life.

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex of gas, and in some torch designs it is conventional to also envelope the gas and arc with a swirling jet of water.

The electrode used in conventional torches of the described type typically comprises an elongate tubular member composed of a material of high thermal conductivity, such as copper or a copper alloy. The forward or discharge end of the tubular electrode includes a bottom end wall having an emissive insert embedded therein which supports the arc. The insert is composed of a material which has a relatively low work function, which is defined in the art as the potential step, measured in electron volts, which permits thermionic emission from the surface of a metal at a given temperature. In view of its low work function, the insert is thus capable of readily emitting electrons when an electrical potential is applied thereto, and commonly used insert materials include hafnium, zirconium, and tungsten.

A significant problem associated with torches of the described type is the short service life of the electrode, particularly when the torch is used with an oxidizing arc gas, such as oxygen or air. More particularly, the gas tends to rapidly oxidize the copper, and as the copper oxidizes, its work function falls. As a result, the oxidized copper which surrounds the insert begins to support the arc in preference to the insert. When this happens, the copper oxide and the supporting copper melt, resulting in the early destruction and failure of the electrode.

It is accordingly an object of the present invention to provide an electrode which is adapted for use in a plasma arc torch of the described type, and which is able to provide a significantly improved service life when the torch is used in an oxidizing atmosphere.

It is also an object of the present invention to provide an efficient method of fabricating an electrode having the above characteristics.

SUMMARY OF THE INVENTION

The above and other objects and advantages of the present invention are achieved in the embodiments illustrated herein by the provision of an electrode which comprises a metallic tubular holder having a front end and a rear end, and a transverse end wall closing the front end. The transverse end wall defines an outer front face, and a cavity is formed in the front face. An insert assembly is mounted in the cavity, and comprises an emissive insert composed of a metallic material which has a relatively low work function so as to be capable of readily emitting electrons upon a potential being applied thereto. A sleeve surrounds the emissive insert so as to separate the insert from contact with the holder. The sleeve has a radial thickness of at least about 0.01 inches at the front end of the holder, and the sleeve is composed of a metallic material having a work function which is greater than that of the material of the emissive insert.

The emissive insert has an outer end face which lies in the plane of the outer front face of the holder, and the sleeve has an outer annular surface which lies in the plane of the front face of the holder and surrounds the end face of the insert. Also, the diameter of the outer annular surface of the sleeve preferably is at least equal to about twice the longest dimension of said outer end face of the emissive insert.

In the preferred embodiment, the sleeve includes a peripheral surface and a closed bottom wall which are metallurgically bonded to the interior walls of the cavity formed in the outer front face of the holder. The sleeve thus totally separates the insert from contact with the metal of the holder.

The annular sleeve which surrounds the emissive insert is preferably formed of a metallic material such as silver which has a high resistance to the formation of an oxide. This serves to increase the service life of the electrode, since the silver and any oxide which does form are very poor emitters. As a result, the arc will continue to emit from the emissive insert, rather than from the copper holder or the sleeve and the result is an increase in its service life.

The present invention also includes a method of fabricating the above described electrode and which comprises the steps of preparing a metallic first blank which has a front face, and forming a cavity in the front face of the blank. A second blank is formed which is composed for example essentially of silver and which is configured and sized so as to permit it to be closely received in the cavity. The second blank is then fixedly mounted in the cavity, and an opening is formed in the second blank, such as by drilling, and which is perpendicular to the front face. An emissive insert is then fixedly mounted in the opening of the second blank.

Preferably, the front face of the metallic blank is then finished to form a substantially planar surface which includes the metallic first blank, the emissive insert, and an annular ring of the second blank which separates the insert from the metallic blank.

BRIEF DESCRIPTION OF THE DRAWINGS

Some of the objects and advantages of the present invention having been stated, others will appear as the description proceeds, when considered in conjunction with the accompanying drawings, in which.

DETAILED DESCRIPTION OF THE PREFERRED EMBODIMENTS

Figure 1:
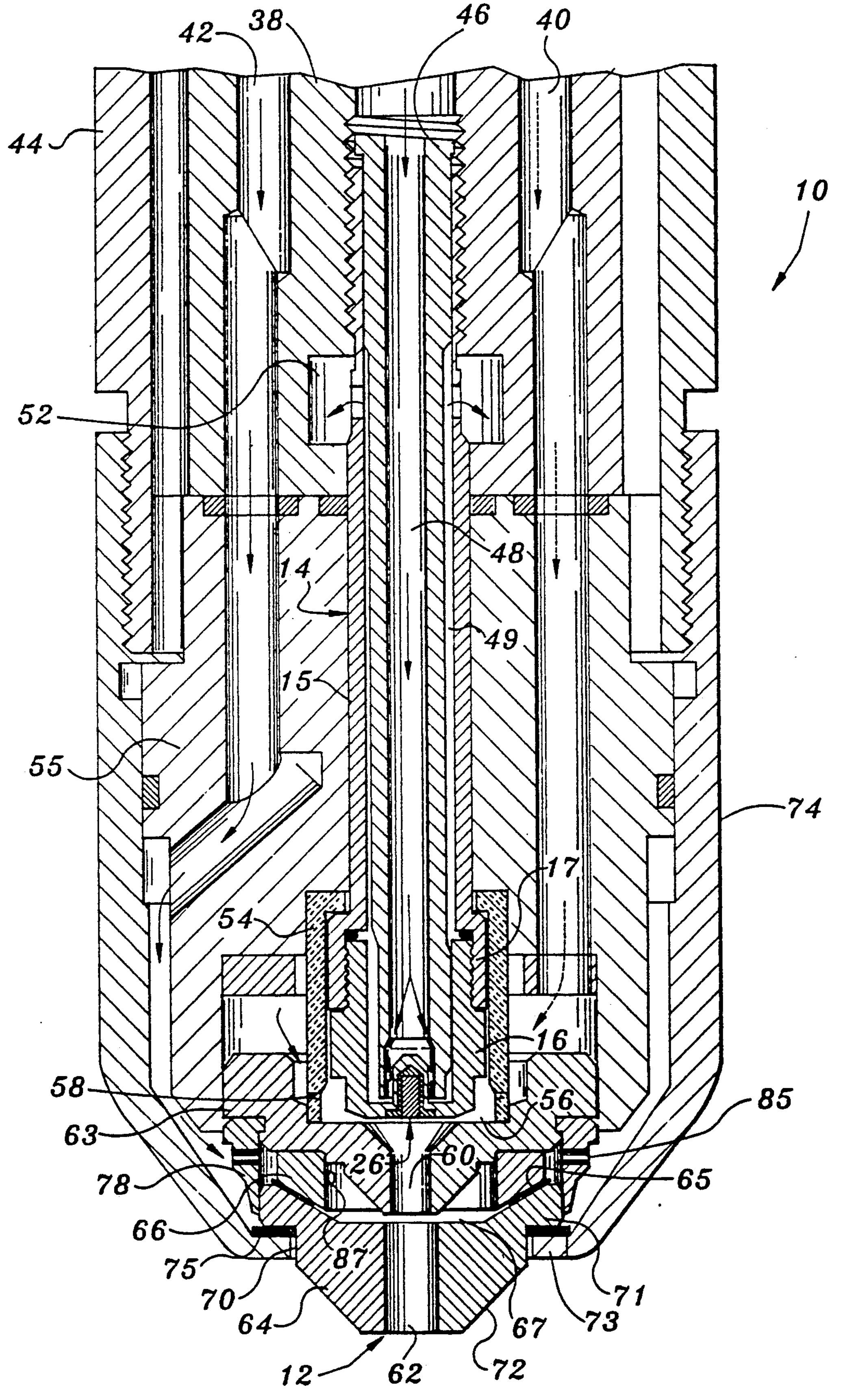
FIG. 1 is a sectioned side elevation view of a plasma arc torch which embodies the features of the present invention.
Figure 2:
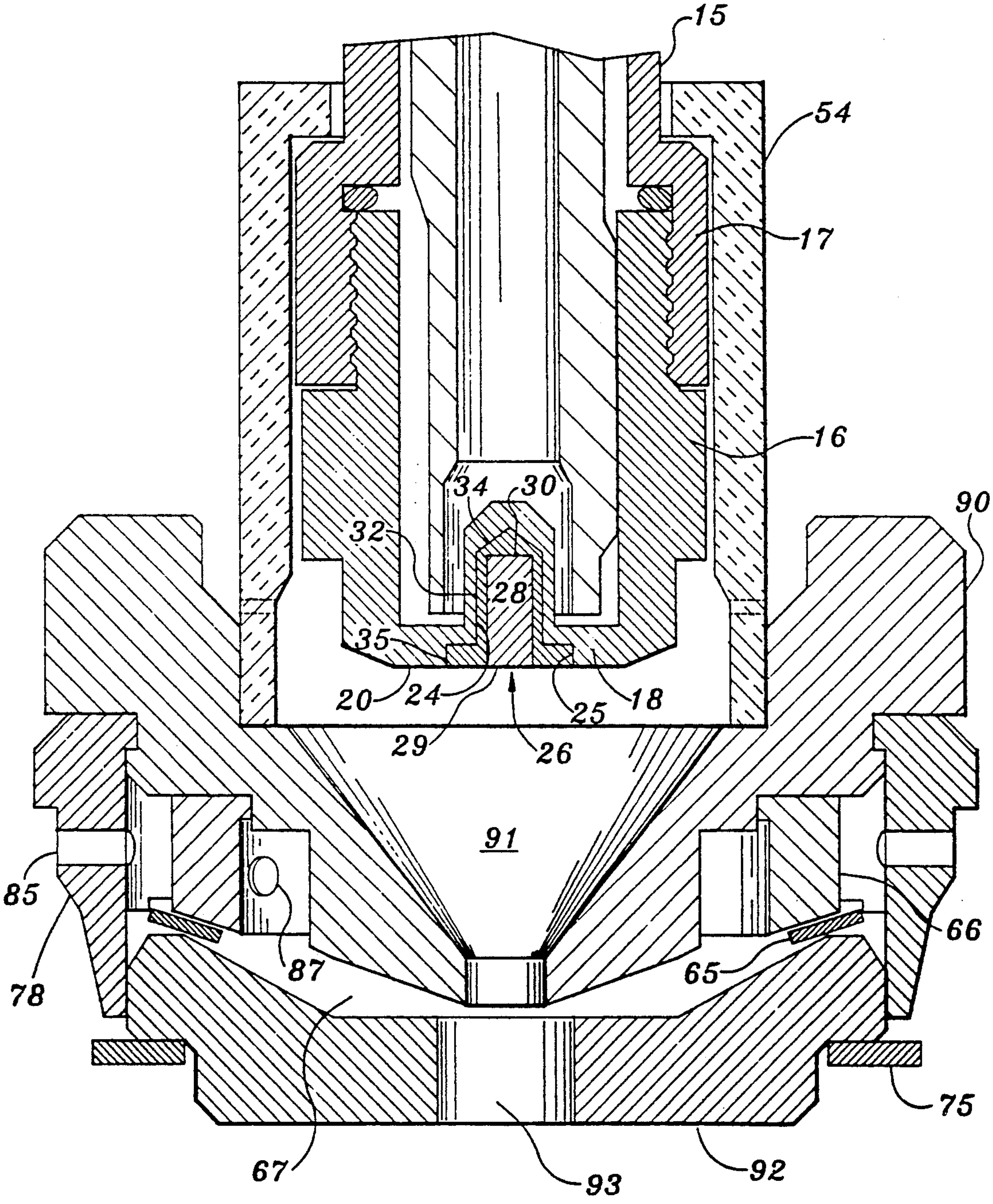
FIG. 2 is a somewhat enlarged fragmentary sectioned view of the lower portion of a plasma arc torch and illustrating a second embodiment of the nozzle assembly of the torch.
Figure 5:
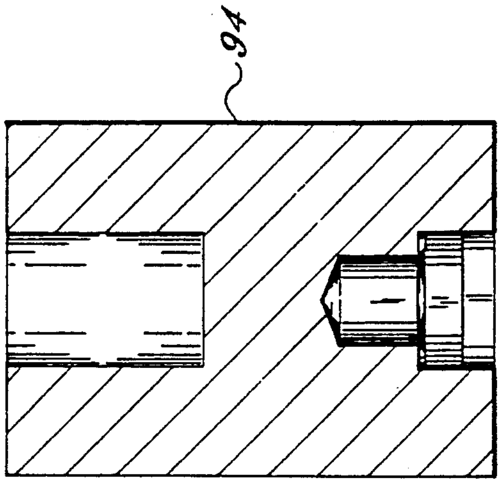
FIGS. 3-7 are schematic views illustrating the steps of the method of fabricating the electrode in accordance with the present invention.

Referring initially to the embodiment of FIG. 1, a plasma arc torch 10 is illustrated which includes a nozzle assembly 12 and a tubular electrode 14. The electrode 14 is preferably made of copper or a copper alloy, and it is composed of an upper tubular member 15 and a lower, cup-shaped member or holder 16. More particularly, the upper tubular member 15 is of elongate open tubular construction and it defines the longitudinal axis of the torch. The member 15 also includes an internally threaded lower end portion 17. The holder 16 is also of tubular construction, and it includes a lower front end and an upper rear end as seen in FIGS. 1 and 2. A transverse end wall 18 (FIG. 2) closes the front end of the holder 16, and the transverse end wall 18 defines an outer front face 20. The rear end of the holder is externally threaded and is threadedly joined to the lower end portion 17 of the upper tubular member.

Figure 6:
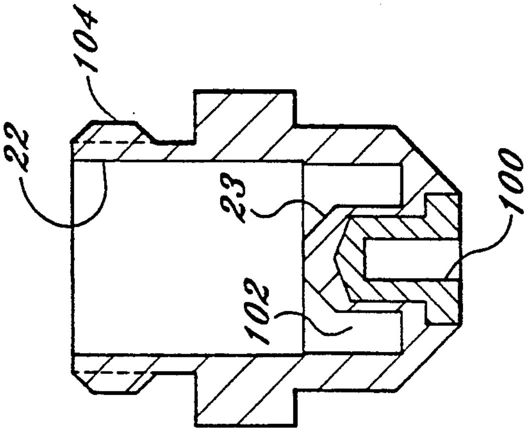
Figure 12:
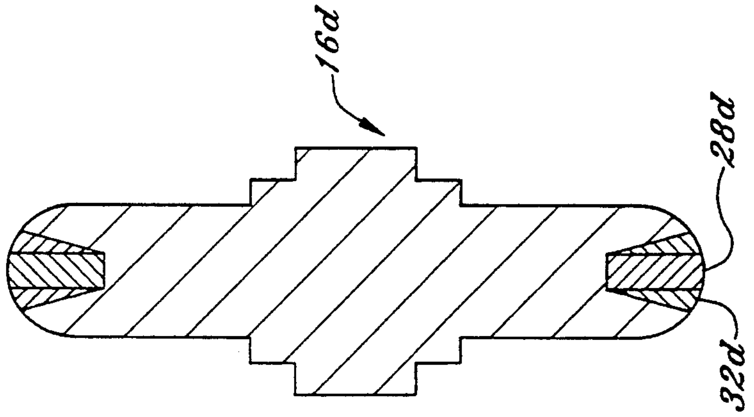
FIGS. 9-12 are sectioned side elevation views of other embodiments of the electrode of the present invention.

The holder 16 is open at the rear end thereof and so that the holder is of cup shaped configuration and defines an internal cavity 22 (FIG. 6). Also, the front end wall 18 of the holder includes a cylindrical post 23 which extends rearwardly into the internal cavity 22 and along the longitudinal axis. In addition, a cavity 24 is formed in the front face 20 of the end wall 18 and which extends rearwardly along the longitudinal axis and into a portion of the length of the post 23. The cavity 24 is generally cylindrical and it includes an enlarged or counterbored annular outer end portion 25 for the purposes described below.

An insert assembly 26 is mounted in the cavity and comprises a generally cylindrical emissive insert 28 which is deposed coaxially along the longitudinal axis and which has a circular outer end face 29 lying in the plane of the front face 20 of the holder. The insert 28 also includes a circular inner end face 30 which is disposed in the cavity 24 and which is opposite the outer end face 29. Further, the emissive insert 28 is composed of a metallic material which has a relatively low work function, in a range between about 2.7 to 4.2 ev, and so that it is adapted to readily emit electrons upon an electrical potential being applied thereto. Suitable examples of such materials are hafnium, zirconium, tungsten, and alloys thereof.

A relatively non-emissive sleeve 32 is positioned in the cavity 24 coaxially about the emissive insert 28, with the sleeve 32 having a peripheral wall and a closed bottom wall 34 which are metallurgically bonded to the walls of the cavity. Further, the sleeve 32 includes an annular flange 35 positioned in the counterbored outer end portion 25 of the cavity and so as to define an outer annular surface which lies in the plane of the front face 20 of the holder. Also, the sleeve has a radial thickness of at least about 0.01 inches at the front face 20 and along its entire length, and preferably the outer diameter of the annular surface at the front face 20 is at least about twice the diameter of the emissive insert 28. As a specific example, the insert 28 typically has a diameter of about 0.080 inches and an axial length of about 0.160 inches, and the annular flange 35 of the sleeve 32 typically has an outer diameter of about 0.254 inches. The outer diameter of the remainder of the sleeve 32 is typically about 0.157 inches.

The sleeve is composed of a metallic material having a work function which is greater than that of the material of the holder, and also greater than that of the material of the emissive insert. In this regard, it is preferred that the sleeve be composed of a metallic material having a work function of at least about 4.3 ev. Several metals and alloys are usable for the non-emissive sleeve of the present invention. Below is a summary of some relevant properties of several suitable metals:

| | THERMAL CONDUCTIVITY (BTU-FT./FT$^2$-Hr°F.) | RESISTANCE TO OXIDATION | MELTING POINT (°F.) | WORK FUNCTION (ev) |
|---|---|---|---|---|
| Silver | 242 | High | 1761 | 4.5 |
| Gold | 172 | Very High | 1945 | 4.9 |
| Platinum | 42 | Very High | 3217 | 5.32 |
| Rhodium | 50 | High | 3560 | 4.8 |
| Iridium | 34 | High | 4429 | 5.4 |
| Palladium | 41 | Good | 2826 | 4.99 |
| Nickel | 53 | Good | 2647 | 5.0 |

The ideal sleeve materials should have high thermal conductivity, high resistance to oxidation, high melting point, high work function, and low cost. No one material has all of these properties, but the very high thermal conductivity of silver makes it a preferred material. As long as the electrode is well cooled, silver will be at a much lower temperature than the other materials by reason of its high thermal conductivity. Since oxidation and electron emission increase at high temperature, the lower melting point and lower work function of silver become less significant.

In addition to the above listed metals, alloys wherein at least 50% of the composition consists of one or more of the listed metals, are also suitable in fabricating the non-emissive sleeve. Further, the sleeve may be composed of an alloy comprising copper and a second metal which is selected from the listed metals and alloys thereof, and wherein the second metal comprises at least about 10% of the material of the sleeve.

In the illustrated embodiment, the electrode 14 is mounted in a plasma arc torch body 38, which has gas and liquid passageways 40 and 42 respectively. The torch body 38 is surrounded by an outer insulated housing member 44.

A tube 46 is suspended within the central bore 48 of the electrode 14 for circulating a liquid medium such as water through the electrode structure 14. The tube 46 is of a diameter smaller than the diameter of the bore 48 so as to provide a space 49 for the water to flow upon discharge from the tube 46. The water flows from a source (not shown) through the tube 46, along the post 23, and back through the space 49 to the opening 52 in the torch body 38 and to a drain hose (not shown). The passageway 42 directs the injection water into the nozzle assembly 12 where it is converted into a swirling vortex for surrounding the plasma arc as will be explained in more detail below. The gas passageway 40 directs gas from a suitable source (not shown), through a conventional gas baffle 54 of any suitable high temperature ceramic material into a gas plenum chamber 56 via inlet holes 58. The inlet holes 58 are arranged so as to cause the gas to enter the plenum chamber 56 in a swirling fashion as is well-known. The gas flows out from the plenum chamber 56 through the arc constricting coaxial bores 60 and 62 of the nozzle assembly 12. The electrode 14 upon being connected to the torch body 38 holds in place the ceramic gas baffle 54 and a high temperature plastic insulating member 55. The member 55 electrically insulates the nozzle assembly 12 from the electrode 14.

The nozzle assembly 12 comprises an upper nozzle member 63 and a lower nozzle member 64, with the members 63 and 64 including the first and second bores 60, 62 respectively. Although the upper and lower nozzle members may both be metal, a ceramic material such as alumina is preferred for the lower nozzle member.

The lower nozzle member 64 is separated from the upper nozzle member 63 by a plastic spacer element 65 and a water swirl ring 66. The space provided between the upper nozzle member 63 and the lower nozzle member 64 forms a water chamber 67. The bore 60 of the upper nozzle member 63 is in axial alignment with the longitudinal axis of the torch electrode 14. Also, the bore 60 is cylindrical, and it has a chamfered upper end adjacent the plenum chamber 56, with a chamfer angle of about 45°.

The lower nozzle member 64 comprises a cylindrical body portion 70 which defines a forward (or lower) end portion and a rearward (or upper) end portion, and with the bore 62 extending coaxially through the body portion. An annular mounting flange 71 is positioned on the rearward end portion, and a frusto-conical surface 72 is formed on the exterior of the forward end portion so as to be coaxial with the second bore 62. The annular flange 71 is supported from below by an inwardly directed flange 73 at the lower end of the cup 74, with the cup 74 being detachably mounted by interconnecting threads to the outer housing member 44. Also, a gasket 75 is disposed between the two flanges 71 and 73.

The arc constricting bore 62 in the lower nozzle member 64 is cylindrical, and it is maintained in axial alignment with the arc constricting bore 60 in the upper member 63 by a centering sleeve 78 of any suitable plastic material. The centering sleeve 78 has a lip at the upper end thereof which is detachably locked into an annular notch in the upper nozzle member 63. The centering sleeve 78 extends from the upper nozzle in biased engagement against the lower member 64. The swirl ring 66 and spacer element 65 are assembled prior to insertion of the lower member 64 into the sleeve 78. The water flows from the passageway 42 through openings 85 in the sleeve 78 to the injection ports 87 of the swirl ring 66, and which inject the water into the water chamber 67. The injection ports 87 are tangentially disposed around the swirl ring 66, to cause the water to form a vortical pattern in the water chamber 67. The water exits the water chamber 67 through the arc constricting bore 62 in the lower nozzle member 64.

A power supply (not shown) is connected to the torch electrode 14 in a series circuit relationship with a metal workpiece which is typically grounded. In operation, the plasma arc is established between the emissive insert of the torch 10 which acts as the cathode terminal for the arc, and the workpiece which is connected to the anode of the power supply, and which is positioned below the lower nozzle member 64. The plasma arc is started in a conventional manner by momentarily establishing a pilot arc between the electrode 14 and the nozzle assembly 12 which is then transferred to the workpiece through the arc constricting bores 60 and 62 respectively. Each arc constricting bore 60 and 62 contributes to the intensification and collimation of the arc, and the swirling vortex of water envelopes the plasma as it passes through the lower passageway 62.

FIG. 2 is a fragmentary view of a second embodiment of a torch in accordance with the present invention. In this embodiment, a nozzle assembly of different design is provided, but the torch is otherwise similar to that shown in FIG. 1. More particularly, the nozzle assembly includes an upper nozzle member 90 having a essentially frusto-conical bore 91, and a relatively flat lower nozzle member 92 having a cylindrical bore 93.

Method of Fabrication

Figure 3:
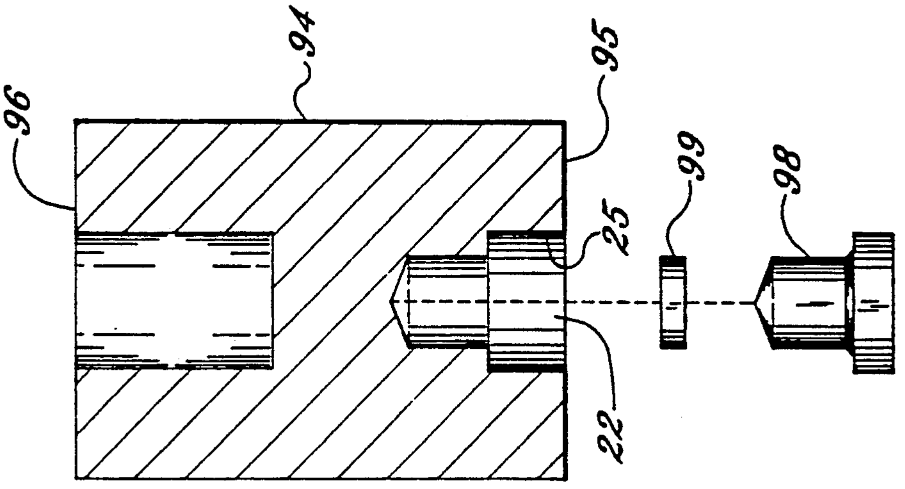
Figure 7:
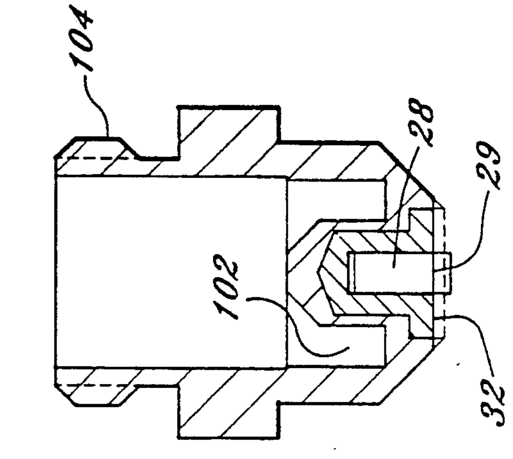
Figure 8:
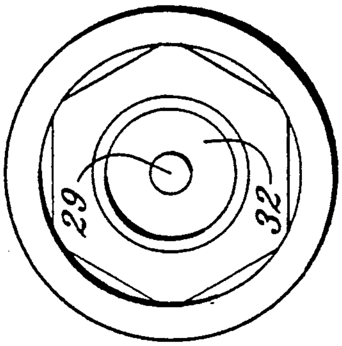
FIG. 8 is an end view of the electrode shown in FIG. 7.

FIGS. 3–7 illustrate a preferred method of fabricating the electrode holder of the present invention. As illustrated in FIG. 3, a cylindrical blank 94 of copper or copper alloy is provided and which has a front face 95 and an opposite rear face 96. A counterbored cavity is then formed in the front face, such as by drilling, which forms the above described cavity 22 and annular outer end portion 25.

A second blank 98 is formed, which may for example be composed essentially of silver, and which is configured and sized to substantially fit within the cavity 22. The silver blank 98 may be shaped by machining, but it is preferred to form the blank 98 by a cold heading process similar to that commonly used in the fabrication of nails.

Figure 4:
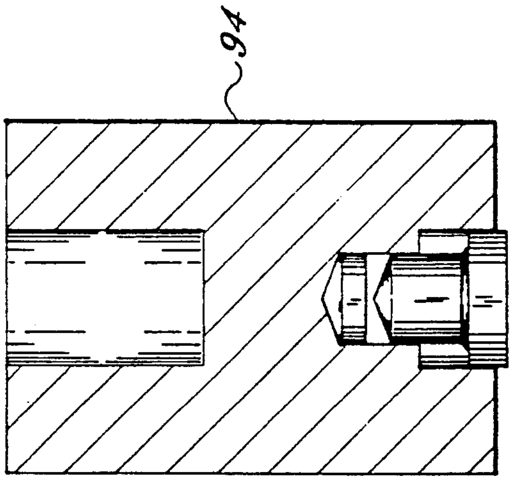

Next, the silver blank 98 is metallurgically bonded into the cavity 22. This process is preferably conducted by first inserting a disc 99 of silver brazing material into the cavity. In one example, the brazing material comprises an alloy composed of 71% silver, ½% nickel, and with the balance composed of copper. Also, a small amount of flux may be included, so as to remove oxides from the surface of the copper. After the disc 99 is inserted into the cavity, the silver blank 98 is introduced as illustrated in FIG. 4, and the assembly is then heated to a temperature only sufficient to melt the brazing material, which has a relatively low melting temperature as compared to the other components. During the heating process, the silver blank 98 is pressed downwardly into the cavity 22, which causes the melted brazing material to flow upwardly and cover the entirety of the interface between the silver blank 98 and the cavity. Upon cooling, the brazing provides a relatively thin coating which serves to bond the blank 98 in the cavity, with the coating having a thickness on the order of between about 0.001 to 0.005 inches.

To complete the fabrication of the holder 16, the silver blank 98 is axially drilled at 100 as illustrated in FIG. 6, and a cylindrical emissive insert 28 is then force fitted into the resulting opening. The front face of the assembly is then preferably finished by machining as indicated in dashed lines in FIG. 7, to provide a smooth outer surface which includes a circular outer end face 29 of the insert, a surrounding annular ring of the resulting silver sleeve 32, and an outer ring of the metal of the holder.

As a final step, the rear surface 96 of the metallic blank 94 is drilled, to form the blank 94 into an open cup-shaped configuration as illustrated in FIG. 6. This drilling operation includes forming a internal open annular ring 102 which coaxially surrounds a portion of the metallic blank and thus forms the above described cylindrical post 23. The open annular ring also coaxially surrounds a portion of the axial length of the emissive insert 28 and the silver blank 98. This construction facilitates the removal of heat by the circulating water as described above. The external periphery of the blank 94 may also then be shaped as desired, including the formation of the external threads 104 at the rear end.

Figure 11:
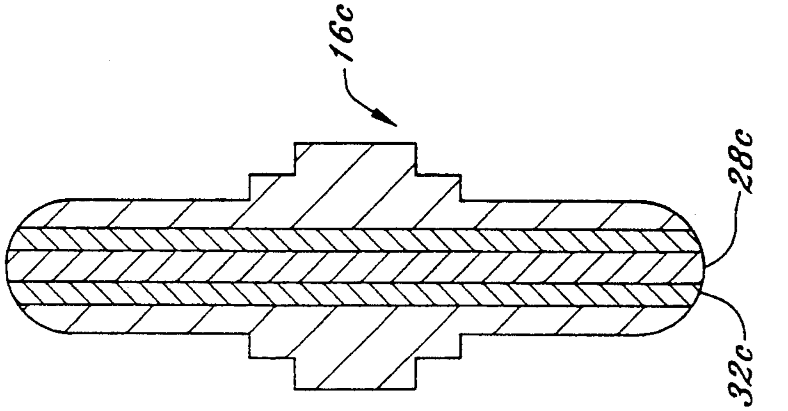
Figure 10:
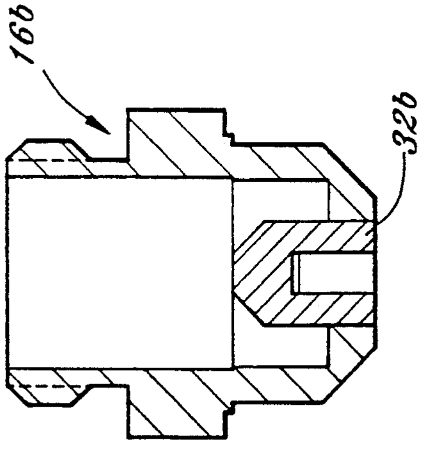
Figure 9:
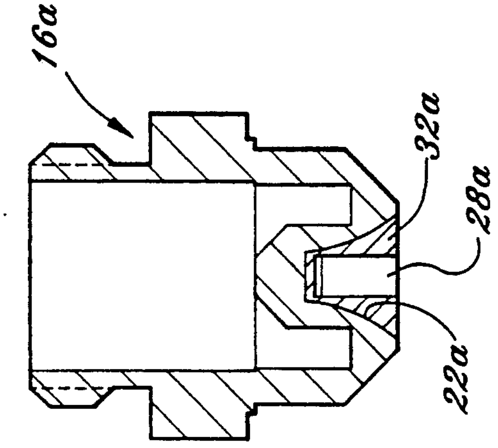

FIGS. 9-12 illustrate other embodiments of electrodes which embody the present invention. More particularly, FIG. 9 illustrates an electrode holder 16*a* wherein the cavity 22*a* and the non-emissive sleeve 32*a* which surrounds the insert 28*a* are of frustoconical outer configuration. In FIG. 10, the holder 16*b* has a through bore in the lower wall, and the non-emissive insert 32*b* extends through the bore and is exposed so as to directly contact the cooling water in the inside of the holder. FIG. 11 illustrates an elongate solid electrode 16*c* having a longitudinal bore extending through its entire length, with an elongate insert 28*c* and surrounding non-emissive sleeve 32*c* extending the full length of the electrode. The electrode 16*d* is of similar construction, but includes a frusto-conical cavity, insert 28*d*, and frusto-conical sleeve 32*d* at each end.

In the drawings and specification, there has been set forth a preferred embodiment of the invention, and although specific terms are employed, they are used in a generic and descriptive sense only and not for purposes of limitation.

That which is claimed is:

1. A method of fabricating an electrode adapted for supporting an arc in a plasma arc torch, and comprising the steps of preparing a metallic first blank which has a front face and an opposite rear face, forming a cavity in said front face of said first blank, forming a metallic second blank which is configured and sized so as to permit it to be closely received in said cavity, fixedly mounting the second blank in said cavity, forming an opening in said second blank which is perpendicular to said front face, fixedly mounting an emissive insert in said opening of said second blank, with said emissive insert being composed of a metallic material having a relatively low work function which is less than that of the material of said second blank and so as to be adapted to emit electrons upon an electric potential being applied thereto, finishing the front face of the first blank to form a substantially planar surface which includes the first blank, said emissive insert, and an annular ring of said second blank which separates said insert from said first blank, and forming said opposite rear face of said first blank into an open cup shaped configuration.

2. The method as defined in claim 1 wherein the step of forming said opposite rear face of said first blank into an open cup shaped configuration includes drilling into said rear face so as to form an internal open annular ring which coaxially surrounds a portion of the metallic blank and a portion of the axial length of said insert and said second blank.

3. A method of fabricating an electrode adapted for supporting an arc in a plasma arc torch, and comprising the steps of preparing a metallic first blank which has a front face, forming a cavity in said front face of said first blank, forming a metallic second blank which is configured and sized so as to permit it to be closely received in said cavity, fixedly mounting the second blank in said cavity and including inserting a disc of brazing material into said cavity, then inserting said second blank into said cavity, and then heating the assembly to melt the brazing material while pressing the second blank into said cavity, forming an opening in said second blank which is perpendicular to said front face, and then fixedly mounting an emissive insert in said opening of said second blank, with said emissive insert being composed of a metallic material having a relatively low work function which is less than that of the material of said second blank and so as to be adapted to emit electrons upon an electric potential being applied thereto.

4. The method as defined in claim 3 wherein the step of fixedly mounting an emissive insert in said opening of said second blank includes force fitting the insert into said opening.

5. The method as defined in claim 3 comprising the further subsequent step of finishing the front face of the first blank to form a substantially planar surface which includes the first blank, said emissive insert, and an annular ring of said second blank which separates said insert from said first blank.

6. The method as defined in claim 5 wherein said first blank has a rear face which is opposite said front face, and comprising the further step of forming said opposite rear face of said first blank into an open cup shaped configuration.

* * * * *

UNITED STATES PATENT AND TRADEMARK OFFICE
CERTIFICATE OF CORRECTION

PATENT NO. : 5,097,111

DATED : March 17, 1992

INVENTOR(S) : Severance, Jr.

It is certified that error appears in the above-identified patent and that said Letters Patent is hereby corrected as shown below:

On the title page:

In the REFERENCES CITED [56]:

The inventors recited for U.S. Patent No. 4,304,984 should be --Bolotnikov et al.-- and not "Bololnikov et al.".

Column 6, line 4, "a" should be --an--;

Column 6, line 59, "a" should be --an--.

Signed and Sealed this

Twenty-first Day of May, 1996

Attest:

BRUCE LEHMAN

*Attesting Officer* *Commissioner of Patents and Trademarks*